No. 637,473. Patented Nov. 21, 1899.
J. A. MÖLLINGER.
MOTOR WATTMETER FOR THREE PHASE ALTERNATING CURRENTS.
(Application filed Aug. 31, 1898.)
(No Model.) 3 Sheets—Sheet 1.

Witnesses
M. F. Keating
Edward L. Spencer

Julius Adolf Möllinger
By atty
Charles J. Kintner

No. 637,473. Patented Nov. 21, 1899.
J. A. MÖLLINGER.
MOTOR WATTMETER FOR THREE PHASE ALTERNATING CURRENTS.
(Application filed Aug. 31, 1898.)
(No Model.) 3 Sheets—Sheet 2.
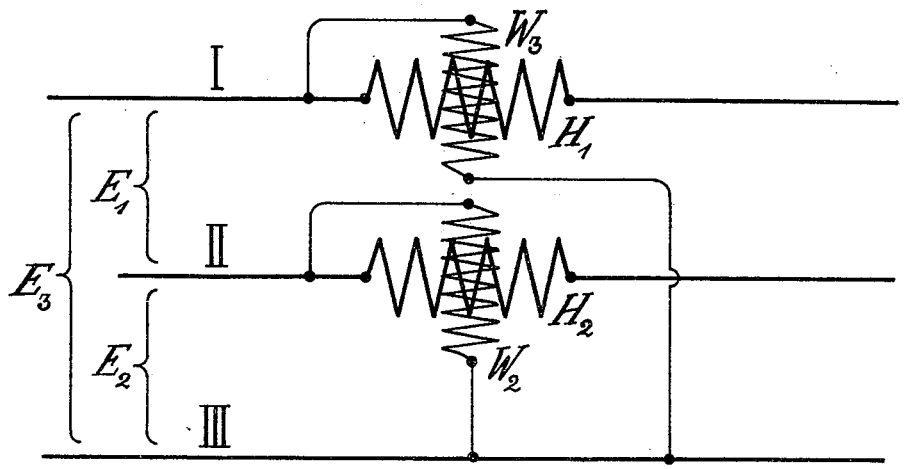
Fig. 3.a.
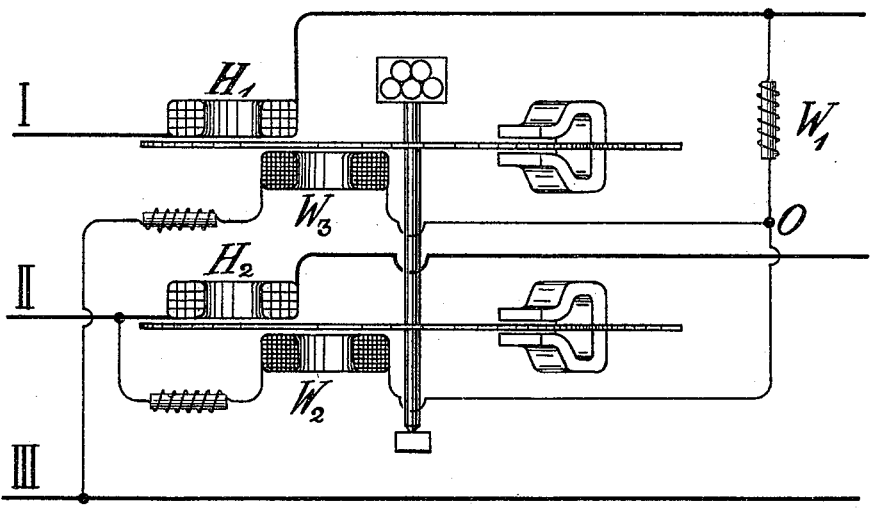
Fig. 3.b.

No. 637,473. Patented Nov. 21, 1899.
J. A. MÖLLINGER.
MOTOR WATTMETER FOR THREE PHASE ALTERNATING CURRENTS.
(Application filed Aug. 31, 1898.)
(No Model.) 3 Sheets—Sheet 3.

Witnesses
M. F. Keating
Edward L. Spencer

Julius Adolf Möllinger
By atty
Charles J. Kintner

UNITED STATES PATENT OFFICE.

JULIUS ADOLF MÖLLINGER, OF NUREMBERG, GERMANY.

MOTOR-WATTMETER FOR THREE-PHASE ALTERNATING CURRENTS.

SPECIFICATION forming part of Letters Patent No. 637,473, dated November 21, 1899.

Application filed August 31, 1898. Serial No. 689,908. (No model.)

*To all whom it may concern:*

Be it known that I, JULIUS ADOLF MÖLLINGER, electrical engineer, a subject of the German Emperor, residing at Nuremberg, in the Kingdom of Bavaria, German Empire, have invented a new and useful Improvement in Motor-Wattmeters for Three-Phase Alternating-Currents, of which the following is a specification.

My invention relates to motor-meters based upon the principle laid down by Ferraris, and has for its object to provide a simple arrangement of apparatus for measuring, indicating, and recording the actual energy transmitted by a three-phase alternating-current system.

Investigations made by Behn-Eschenburg and O. B. Shallenberger have shown that the total energy consumed in a three-phase system, whatever may be the load, can be measured by two meters of the induction type, so arranged that the series coil of the first meter is inserted in the first branch of the main line, the series coil of the second meter in the second branch of the main line, the shunt field-magnet of the first meter being in quadrature between the first and third mains, and the shunt field-magnet in the second meter being in quadrature between the second and third mains.

The present invention has for its object the giving to shunt magnet-fields of such a meter system the proper phase relations. In order to obtain this, I arrange the shunt field-magnets of the two meters so that their phase displacement is sixty degrees and combine with the same a choking-coil having a phase displacement of sixty degrees, the arrangement being such that the shunt-magnet coils are connected at one end to all of the mains and at the other end to a point intermediate the mains.

My invention is illustrated in the accompanying drawings, in which—

Figure 1:
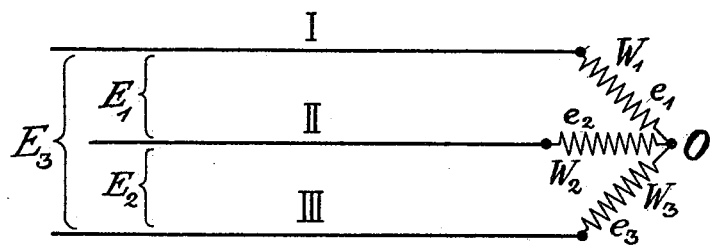
Figure 2:
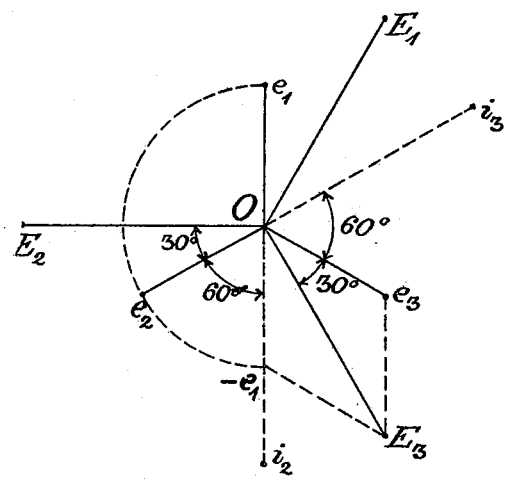
Figure 3:
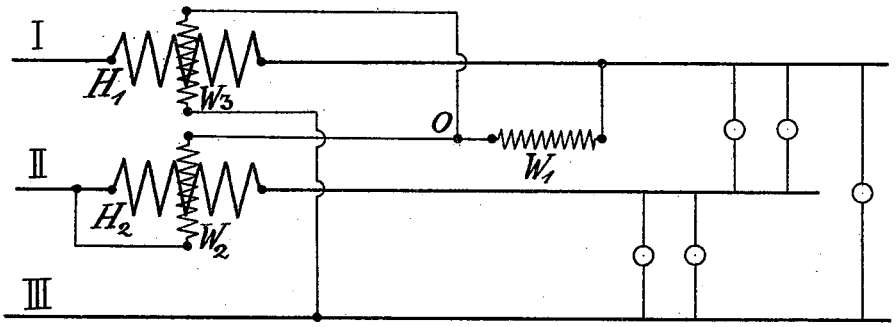
Figure 4:
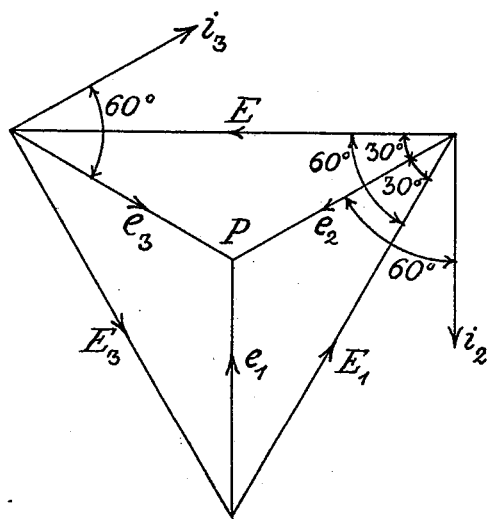
Figure 5:
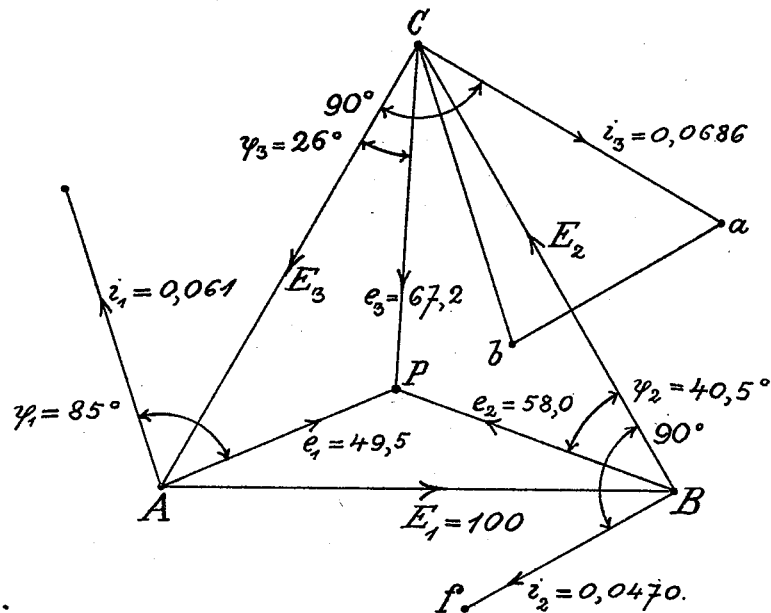

Figure 1 is a diagram of a three-phase system with resistances in star connection. Fig. 2 is a clock diagram showing the relations of the currents and electromotive forces prevailing in the three-phase system. Fig. 3 is a diagram of the connections for a motor-wattmeter for a three-phase system. Fig. 3ª is a diagram illustrating a former known method of measuring the energy which is consumed in a three-phase system by means of two wattmeters. Fig. 3ᵇ illustrates the arrangement of a meter based upon the principle of Ferraris according to the present invention, in combination with the connections illustrated by Fig. 3. Figs. 4 and 5 are diagrams showing graphically the value and relations of the currents and pressures for a given instance.

When three inductive resistances $W_1$ $W_2$ $W_3$ of similar construction are connected to the three mains I II III, Fig. 1, on one side and on the other to a point O, then the prevailing pressure $e_1$ $e_2$ $e_3$ at the ends of the resistances have to the pressures $E_1$ $E_2$ $E_3$ prevailing between the mains I II III the relation shown in the diagram Fig. 2. It is here seen that $E_3$ toward $e_3$, as well as $E_2$ toward $e_2$, is displaced by thirty degrees. If the resistances $W_1$ $W_2$ $W_3$ are so proportioned that their currents $i_1$ $i_2$ $i_3$ have a lag of sixty degrees to their terminal pressures $e_1$ $e_2$ $e_3$, then the current $i_3$ flowing in $W_3$ is vertical to $E_3$ and the current $i_2$ flowing in $W_2$ is vertical to $E_2$. It is well known (see *Elektrotechnische Zeitschrift*, 1892, page 73, Behn-Eschenburg) that the total energy consumed in a three-phase system is measured by two wattmeters, which, according to Fig. 3ª, are inserted in a three-phase system wherein the series coil $H_1$ of one wattmeter is inserted in the main I and the pressure-coil $W_3$ of same connected between the mains I and III and excited from $E_3$, while the series coil $H_2$ of the other wattmeter is inserted in the main II and the pressure-coil $W_2$ of same connected between the mains II and III and excited from $E_2$.

In order to obtain the result sought, I arrange the shunt field-magnets $W_2$ and $W_3$ of the two meters, Figs. 3 and 3ᵇ, so that the phase displacement of the currents flowing in their coils is sixty degrees, combining the coils of the magnets with choking-coils in such manner that the shunt magnetic coils $W_1$ $W_2$ $W_3$ are connected at the one end to the mains I II III, respectively, and at the other end united, forming the point O. By this arrangement a magnetic field in quadrature with the pressure $E_3$ is produced in the coil $W_3$, and similarly a magnetic field in quadrature with the pressure $E_2$ is produced in the coil $W_3$, as will be seen from the description and diagram shown in Fig. 2. Now if (according to Fig. 3$^b$) the pressure-coil $W_3$, in combination with a series coil $H_1$ inserted in the main line I, be made to act upon a closed secondary member of conducting metal—as, for example, a disk or cylinder—and similarly if the pressure-coil $W_2$, in combination with a series coil $H_2$ inserted in the main line II, be made to act upon another closed secondary member, both disks or cylinders being mounted on the same rotary axis A and between the permanent magnets $M_1$ and $M_2$, the said axis will rotate with a speed proportional to the energy consumed in the three-phase system. My measuring device therefore consists of a rotary secondary member of conducting metal, two series coils inserted in the first and second main lines, respectively, two pressure-coils, one of which is connected at the one end to the third main line and acting, together with a series coil inserted in the first main line, upon the said rotary secondary member. The other pressure-coil is connected at the one end to the second main line and acts, together with a series coil inserted in the second main line, upon the said rotary secondary member, a choking-coil $W_1$, connected at one end to the first main line and at the other end to the terminals of the two pressure-coils. Further, it is well known that meters which are based upon the principle of Ferraris, as well as wattmeters, are exact energy-meters if the magnet-field of the shunt is situated vertical to $E_3$. (See American Patent No. 531,869, of Schallenberger.) From these two facts it results that the energy consumed in a three-phase system may be measured by two meters which are based upon the principle of Ferraris if the series coil $H_1$ of the one meter is inserted in line I and the series coil of the other meter is inserted in line II, and if the coil $H_1$ of the first meter is permitted to work with a shunt-coil the magnet-field of which is vertical to $E_3$ and if the coil $H_2$ of the second meter is permitted to work with a shunt-coil the magnet-field of which is vertical to $E_2$. It therefore results that the energy consumed in a three-phase system may be measured by a combination such as is illustrated in Fig. 3. Therein $W_1$ $W_2$ $W_3$ are the above-described and in Fig. 1 illustrated induction-coils, the currents, and therefore also the magnetisms, of which show a displacement of sixty degrees with respect to the tensions $e_1$ $e_2$ $e_3$. $W_3$ works with a series coil $H_1$, which is inserted in line I of a meter based upon the principle of Ferraris. $W_2$ works with the series coil $H_2$, which is inserted in line II of a second meter of the said kind. Because the magnet-fields of $W_3$ and $W_2$ are respectively vertical to $E_3$ and $E_2$ these meters in unison measure the energy consumed in the three-phase system. That this arrangement necessitates the use of shunt-magnet coils W so arranged that the current flowing in each of the said coils is displaced by sixty degrees with respect to the impressed electromotive force is a special advantage, inasmuch as these in practice can easily be produced, and, what is essential, they use up very little energy, owing to other reasons, as well as because the actual energy is in the proportion cos. $60° = 0.5$ times smaller than the apparent, and therefore a very powerful exciting current can be used with a very small watt consumption, which is specially advantageous. When the three resistances $W_1$ $W_2$ $W_3$ have equal electrical proportions—i. e., when they take up equal current at equal pressure and these currents have an equal displacement against the pressure—then the three pressures $e$ have a displacement equal toward each other and thirty degrees toward E. In this case all the shunts connected between the mains and the point O must have a displacement of sixty degrees in order that the essential condition—that $i_3$ is vertical to $E_3$ and $i_2$ vertical to $E_2$—is complied with. The pressures $e_1$ $e_2$ $e_3$ then intersect at the center of the isosceles triangle formed by the pressures E, Fig. 4. Should, however, the three shunt-circuits have different electrical proportions, then the pressures $e$, taken together, are no longer equal, but have different displacement to E. With this connection it is, however, possible to comply with the essential condition $$i_2 \perp E_2 \text{ and } i_3 \perp E_3,$$

provided that the three shunt-coils $W_1$ $W_2$ $W_3$ do not have equal electrical proportions. This may be shown as follows: Assuming we have the coils $W_2$ and $W_3$ and that for $W_2$ Resistances. Coefficient of self-induction.
$$R_2 = 800 \, \Omega \quad L_2 = 3.0 \text{ henries},$$

while for $W_3$ $$R_3 = 430 \, \Omega \quad L_3 = 2.8 \text{ henries},$$

and that with the use of these coils of unequal electrical proportions a three-phase measuring apparatus is to be constructed for an installation working with fifty periods, one hundred alternations. For $W_2$ $$\text{Tang. } \varphi_2 = \frac{100 \times 3.14 \times 3.0}{800} = 1.178,$$

a displacement $\varphi_2 = 49.5°$ between current $i_2$ and pressure $e_2$. The impedance shows $$I_2 = \sqrt{800^2 + 100^2 \times 3.14^2 \times 3^2} = 1.233.$$

In the same way for $W_3$ $$\text{Tang. } \varphi_3 = \frac{100 \times 3.14 \times 2.8}{430} = 2.041.$$

A displacement $\varphi_3 = 64°$ is shown between current $i_3$ and pressure $e_3$. The impedance is $$I_3 = \sqrt{430^2 + 100^2 \times 3.14^2 \times 2.8^2} = 980.$$

As $i_2$ must be vertical to $E_2$ and $i_3$ vertical to $E_3$ and $i_2$ is displaced by $\varphi_2 = 49.5°$ against $e_2$, $e_2$ must have a displacement toward $E_2$ of $\gamma_2 = 90° - 49.5° = 40.5°$ and $e_3$ toward $E_3$ a displacement of $\gamma_3 = 90° - 64° = 26°$. $e_2$ and $e_3$ must therefore have the positions shown in Fig. 5. As, however, the three pressures $e_1 \, e_2 \, e_3$ must intersect at a point P the position of $e_1$ and the size of $e_1 \, e_2 \, e_3$ are shown by the angle $\gamma_1$ and $\gamma_3$. The three side pressures $e$ result on the diagram in $$e_1 = 49.5 \text{ millimeters,}$$
$$e_2 = 58.0 \text{ millimeters,}$$
$$e_3 = 67.2 \text{ millimeters,}$$

while $E_1 \, E_2 \, E_3 = 100$ millimeters. When, therefore, the pressure of the three-phase current amounts to one hundred volts, then 58.0 volts will be present at $W_2$ and 67.2 at $W_3$. It is then and only then possible to obtain with the coils $W_2$ and $W_3$ from the above-mentioned constants currents $i_2$ and $i_3$, which are vertical to $E_2$ and $E_3$, respectively. With these pressures the following currents flow in $W_2$ and $W_3$:

$$i_2 = \frac{e_2}{I_2} = \frac{58.0}{1233} = 0.0470 \text{ ampere}$$

and $$i_3 = \frac{e_3}{I_3} = \frac{67.2}{980} = 0.0686 \text{ ampere.}$$

As, however, the three induction-coils $W_1 \, W_2 \, W_3$ come together at one point O, the three currents $i_1 \, i_2 \, i_3$ in same must always sum up null—i. e., the lines which represent $i_1 \, i_2 \, i_3$ in the polar diagram must close to a triangle. If, therefore, we draw the line $ab$ ⊁ $Bf$ through the end point $a$ from $i_3$ and unite $b$ with C, then $b$ C show the position and size of current $i$ and yields $$i_1 = 0.061 \text{ ampere and } \gamma_1 = \measuredangle \frac{e_1}{i_1} = 85°$$

and a resistance $$R_1 = \frac{e_1}{i_1} \cdot \frac{1}{\sqrt{1+\text{tg.}^2 \varphi_1}} = \frac{49.5}{0.061} \cdot \frac{1}{\sqrt{1+(11.4)^2}} = 70.6 \, \Omega$$

and a coefficient of self-induction of $$L_1 = \frac{70.6 \cdot 11.4}{314} = 2.56 \text{ henries.}$$

When, therefore, the three resistances $W_1 \, W_2 \, W_3$, with the unequal electrical constants $$R_1 = 70.6 \, \Omega \quad L_1 = 2.56 \text{ henries}$$
$$R_2 = 800 \, \Omega \quad L_2 = 3.00 \text{ henries}$$
$$R_3 = 430 \, \Omega \quad L_3 = 2.80 \text{ henries,}$$

are inserted into a three-phase system in the manner shown in Fig. 3, and $W_3$, with a series coil $H_1$ connected in main I, and $W_2$ with a series coil $H_2$ connected in main II, are each allowed to operate in a Ferraris measuring apparatus, then the combination of both measuring apparatus will show the total electrical energy consumed in the three-phase system.

It is therefore not necessary that the three induction-coils $W_1 \, W_2 \, W_3$ have equal electrical proportions, and with this connection an accurately-working measuring apparatus can in many cases be produced, even when $W_1 \, W_2 \, W_3$ have unequal electrical proportions.

In order to measure the three-phase energy with two measuring apparatus arranged as above described, two single measuring apparatus may be made use of, with two separate dial-plates and different constants, and add their multiplied readings, or it is possible to mechanically couple two of such measuring instruments of equal constants, so that only one reading results, which includes the sum of the effect of both instruments.

In the illustrated arrangements the total series current always runs through the coils $H_1$ and $H_2$. In the use of the total arrangement, however, nothing is altered if instead of the total current only a part of it runs through the coils themselves and the other part runs through resistances which lie parallel to the series coil, or if the series coils are fed by the secondary coils of two transformers whose primary coils are inserted, respectively, in line I or line II.

Having thus described my invention, what I claim, and desire to secure by Letters Patent of the United States, is—

1. A motor-wattmeter for three-phase alternating currents consisting of two induction-motors having inducing-coils in series relation each with one of the current-mains and secondary inducing-coils connected one to the third current-main and the other to one of the first-named mains and both to a shunt resistance connected in circuit with the other current-main, substantially as and for the purpose described.

2. A motor-wattmeter for three-phase alternating currents consisting of two induction-motors having each two sets of actuating-coils, one consisting of a series coil excited directly by the current flowing in the first main and a shunt-coil connected between the third main and a resistance, the other consisting of a series coil excited directly by the current flowing in the second main and a shunt-coil connected between the same and said resistance and a connection from the said resistance to the other main, substantially as and for the purpose described.

Signed at Nuremberg, in the Kingdom of Bavaria, German Empire, this 13th day of August, A. D. 1898.

JULIUS ADOLF MÖLLINGER.

Witnesses:
JAKOB BIERLEIN,
OSCAR BOCK.